US012424760B2

(12) United States Patent
Chang et al.

(10) Patent No.: US 12,424,760 B2
(45) Date of Patent: Sep. 23, 2025

(54) ANTENNA

(71) Applicant: MEDIATEK INC., Hsinchu (TW)

(72) Inventors: Hsuan-Jui Chang, Hsinchu (TW); Nai-Chen Liu, Hsinchu (TW); Shih-Huang Yeh, Hsinchu (TW); Chung-Hsin Chiang, Hsinchu (TW); Wun-Jian Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 302 days.

(21) Appl. No.: 18/344,113

(22) Filed: Jun. 29, 2023

(65) Prior Publication Data

US 2024/0039165 A1 Feb. 1, 2024

Related U.S. Application Data

(60) Provisional application No. 63/369,772, filed on Jul. 29, 2022.

(51) Int. Cl.
*H01Q 5/364* (2015.01)
*H01Q 1/42* (2006.01)
*H01Q 13/16* (2006.01)

(52) U.S. Cl.
CPC ............... *H01Q 13/16* (2013.01); *H01Q 1/42* (2013.01)

(58) Field of Classification Search
CPC .......... H01Q 13/16; H01Q 1/42; H01Q 1/241; H01Q 1/242; H01Q 1/243; H01Q 5/364; H01Q 19/108
See application file for complete search history.

(56) References Cited

U.S. PATENT DOCUMENTS

| | | | | |
|---|---|---|---|---|
| 11,641,054 B2 * | 5/2023 | Huang | H01Q 1/2266 343/904 |
| 2011/0032166 A1 * | 2/2011 | Zhang | H01Q 9/30 343/700 MS |
| 2014/0085145 A1 * | 3/2014 | Chen | H01Q 5/371 343/700 MS |
| 2021/0075090 A1 * | 3/2021 | Yarga | H01Q 1/241 |
| 2024/0055762 A1 * | 2/2024 | Cai | H01Q 1/243 |
| 2024/0347903 A1 * | 10/2024 | Xue | H01Q 1/243 |

* cited by examiner

*Primary Examiner* — Awat M Salih

(74) *Attorney, Agent, or Firm* — McClure, Qualey & Rodack, LLP

(57) ABSTRACT

An antenna is provided. The antenna includes a first radiator and a second radiator. The first radiator includes a first section and a second section. The first section includes a first grounding edge and a first bending edge. The second section is connected to the first bending edge. The first grounding edge is grounded. The first section is not parallel to the second section. A first slot is formed on the first section. The second radiator includes a third section and a fourth section. The third section includes a second grounding edge and a second bending edge. The fourth section is connected to the second bending edge. The second grounding edge is grounded. The third section is not parallel to the fourth section. The first section is parallel to the third section.

20 Claims, 14 Drawing Sheets

ANTENNA

CROSS REFERENCE TO RELATED APPLICATIONS

This application claims the benefit of U.S. Provisional Application No. 63/369,772, filed Jul. 29, 2022, the entirety of which is incorporated by reference herein.

BACKGROUND OF THE INVENTION

Field of the Invention

The present invention relates to an antenna, and, in particular, to an antenna with improved transmission effects.

Description of the Related Art

With the increased requirements on wireless signal transmission, it is important to provide an antenna with wideband and high gain characteristics. Conventionally, there are several known techniques for enhancing bandwidth and gain. However, most such techniques cannot be utilized at the same time. In addition, even if the antenna has the characteristics of wideband and high gain at the same time, the structure of the antenna is usually very complicated or bulky.

Conventional antennas with dipole sections and path sections are utilized to transmit low-band signals and high-band signals. However, this antenna cannot satisfy the requirements for transmission of three different frequency bands.

BRIEF SUMMARY OF THE INVENTION

An embodiment of the present invention provides an antenna. The antenna includes a first radiator and a second radiator. The first radiator includes a first section and a second section. The first section includes a first grounding edge and a first bending edge. The second section is connected to the first bending edge. The first grounding edge is grounded. The first section is not parallel to the second section. A first slot is formed on the first section. The second radiator includes a third section and a fourth section. The third section includes a second grounding edge and a second bending edge. The fourth section is connected to the second bending edge. The second grounding edge is grounded. The third section is not parallel to the fourth section. The first section is parallel to the third section.

In one embodiment, the first section length is measured from the first grounding edge to the first bending edge, the first minimum distance is measured from the first slot to the first bending edge, the first minimum distance is greater than zero, and a ratio of the first section length to the first minimum distance is between 6 and 11.

In one embodiment, the first slot is a longitudinal slot, and the first slot extends in a direction parallel to the first bending edge.

In one embodiment, the first slot is a longitudinal slot, and the first slot extends in a direction perpendicular to the first bending edge.

In one embodiment, the first slot is a notch, and the first slot extends to a lateral edge of the first section.

In one embodiment, the first slot is an enclosed slot.

In one embodiment, a first auxiliary slot is formed on the first section, and the first auxiliary slot is measured from the first slot to the first grounding edge.

In one embodiment, a second slot is formed on the second section, the second section has a free edge, a second section length is measured from the free edge to the first bending edge, a second minimum distance is measured from the second slot to the first bending edge, the second minimum distance is greater than zero, and a ratio of the second section length to the second minimum distance is between 6 and 11.

In one embodiment, a second auxiliary slot is formed on the second section, and the second auxiliary slot is measured from the second slot to the free edge.

In one embodiment, the antenna further includes a feed conductor, wherein the feed conductor is disposed between the first section and the third section, and the feed conductor is coupled to the first radiator and the second radiator.

In one embodiment, a third slot is formed on the third section. The first slot is symmetric to the third slot relative to the symmetric plane. The symmetric plane is parallel to the first section and the third section. The symmetric plane is located between the first section and the third section.

In one embodiment, the second section is perpendicular to the first section, the fourth section is perpendicular to the third section, and the first radiator is symmetric to the second radiator relative to the symmetric plane.

In one embodiment, the first section is a multi-layer stacked IC package, and the second section is a metal sheet.

In one embodiment, the first radiator is an integrally formed metal sheet.

In another embodiment, an antenna is provided. The antenna includes a first radiator and a second radiator. The first radiator includes a first section and a second section. The first section comprises a first grounding edge and a first bending edge. The second section is connected to the first bending edge. The first grounding edge is grounded. The first section is not parallel to the second section. A slot is formed on the second section. The second radiator includes a third section and a fourth section. The third section comprises a second grounding edge and a second bending edge. The fourth section is connected to the second bending edge. The second grounding edge is grounded. The third section is not parallel to the fourth section. A second slot is formed on the third section. The first section is parallel to the third section.

In one embodiment, the second section has a free edge. The section length is measured from the free edge to the first bending edge. The minimum distance is measured from the slot to the first bending edge. The minimum distance is greater than zero. The ratio of the section length to the minimum distance is between 6 and 11.

In another embodiment, an antenna is provided. The antenna includes a first radiator and a second radiator. The first radiator includes a first section and a second section. The first section comprises a first grounding edge and a first bending edge. The second section is connected to the first bending edge. The first grounding edge is grounded. The second section is perpendicular to the first section. The second section extends in a first direction. A first slot is formed on the first radiator. The second radiator includes a third section and a fourth section. The third section comprises a second grounding edge and a second bending edge. The fourth section is connected to the second bending edge. The second grounding edge is grounded. The fourth section is perpendicular to the third section. A second slot is formed on the third section, the first section is parallel to the third section. The fourth section extends in a second direction, and the second direction is opposite to the first direction.

In one embodiment, a third slot is formed on the second radiator. The first slot is symmetric to the third slot relative to the symmetric plane. The symmetric plane is parallel to the first section and the third section. The symmetric plane is located between the first section and the third section.

In one embodiment, the antenna further includes a grounding member, the first grounding edge is connected to the grounding member, the second grounding edge is connected to the grounding member, the first section is perpendicular to the grounding member, and the third section is perpendicular to the grounding member.

Compared to the conventional antenna with dipole sections and path sections, the antenna of the embodiment of the invention can transmit a higher-band signal relative to the low-band signal and the high-band signal transmitted by the conventional antenna. That means, the antenna of the embodiment of the invention can transmit wireless signals of three different bands. In the embodiment of the invention, the first slot increases the path of the surface current on the first section and generates additional radiation mode with high-gain performance. The second slot increases the path of the surface current on the second section, which enhances the directivity of the high-band signal and leads to high-gain performance.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1A:
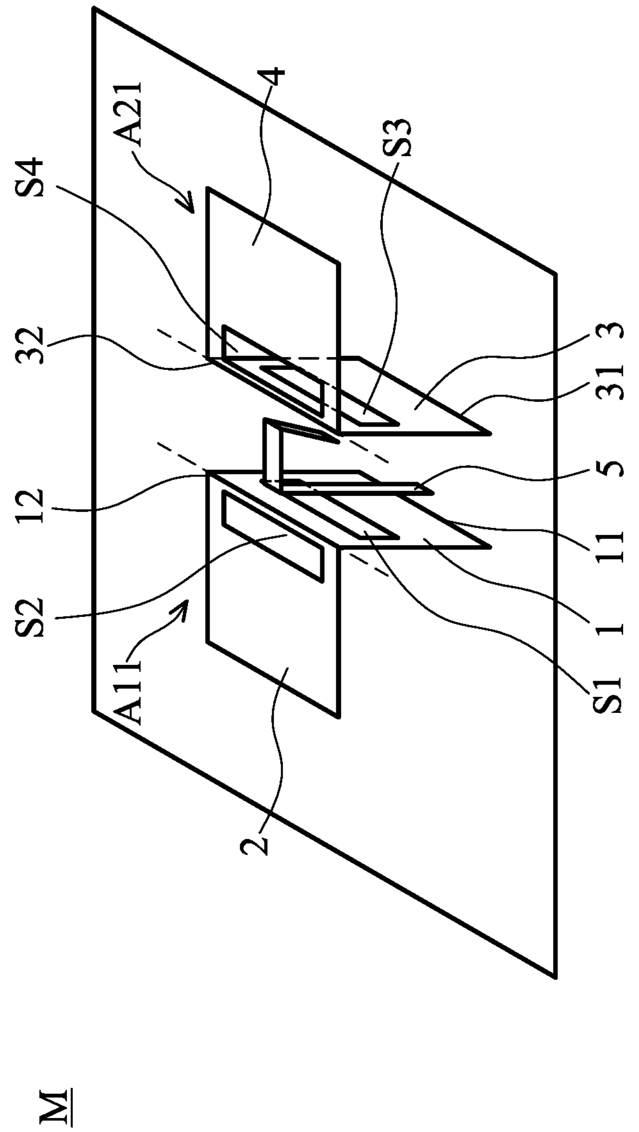
FIG. 1A is a perspective view of an antenna of a first embodiment of the invention.

FIG. 1A is a perspective view of an antenna of a first embodiment of the invention. With reference to FIG. 1A, the antenna M includes a first radiator A11 and a second radiator A21. The first radiator A11 includes a first section 1 and a second section 2. The first section 1 includes a first grounding edge 11 and a first bending edge 12. The second section 2 is connected to the first bending edge 12. The first grounding edge 11 is grounded. The first section 1 is not parallel to the second section 2. A first slot S1 is formed on the first section 1. The second radiator A21 includes a third section 3 and a fourth section 4. The third section 3 includes a second grounding edge 31 and a second bending edge 32. The fourth section 4 is connected to the second bending edge 32. The second grounding edge 31 is grounded. The third section 3 is not parallel to the fourth section 4. The first section 1 is parallel to the third section 3.

Figure 1B:
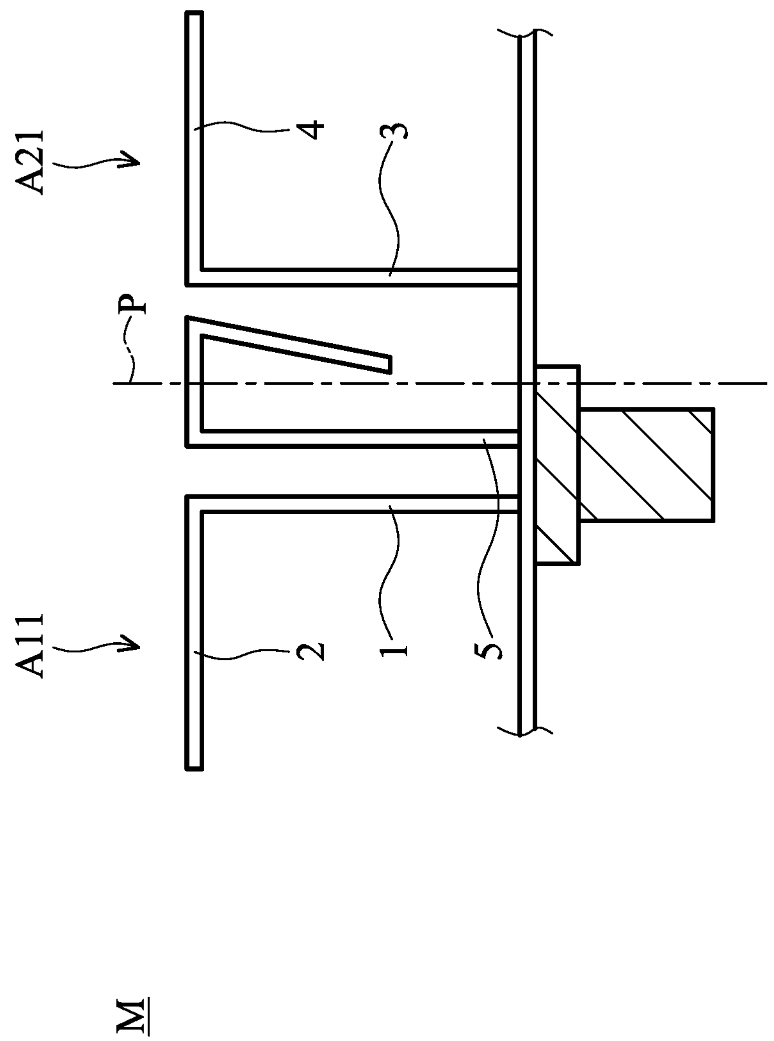
FIG. 1B is a side view of the antenna of the first embodiment of the invention.

FIG. 1B is a side view of the antenna of the first embodiment of the invention. With reference to FIGS. 1A and 1B, in one embodiment, the second section 2 is perpendicular to the first section 1. The fourth section 4 is perpendicular to the third section 3. The second section 2 extends in a first direction X1. The fourth section 4 extends in a second direction X2, and the second direction X2 is opposite to the first direction X1. The first radiator A11 is symmetric to the second radiator A21 relative to the symmetric plane P. The symmetric plane P is parallel to the first section 1 and the third section 3. The symmetric plane P is located between the first section 1 and the third section 3. However, the disclosure is not meant to restrict the invention. For example, in another embodiment, the second section 2 is not perpendicular to the first section 1.

With reference to FIGS. 1A and 1B, in one embodiment, the antenna M further includes a feed conductor 5. The feed conductor 5 is disposed between the first section 1 and the third section 3, and the feed conductor 5 is coupled to the first radiator A11 and the second radiator A21 to feed a feeding signal.

With reference to FIGS. 1A and 1B, in one embodiment, the antenna further includes a grounding member 6. The first grounding edge 11 is connected to the grounding member 6. The second grounding edge 31 of is connected to the grounding member 6. The first section 1 is perpendicular to the grounding member 6, and the third section 3 is perpendicular to the grounding member 6.

With reference to FIGS. 1A and 1B, in one embodiment, a second slot S2 is formed on the second section 2. A third slot S3 is formed on the third section 3. A fourth slot S4 is formed on the fourth section 4. The first slot S1 is symmetric to the third slot S3 relative to the symmetric plane P. Similarly, the second slot S2 is symmetric to the fourth slot S4 relative to the symmetric plane P.

Figure 1C:
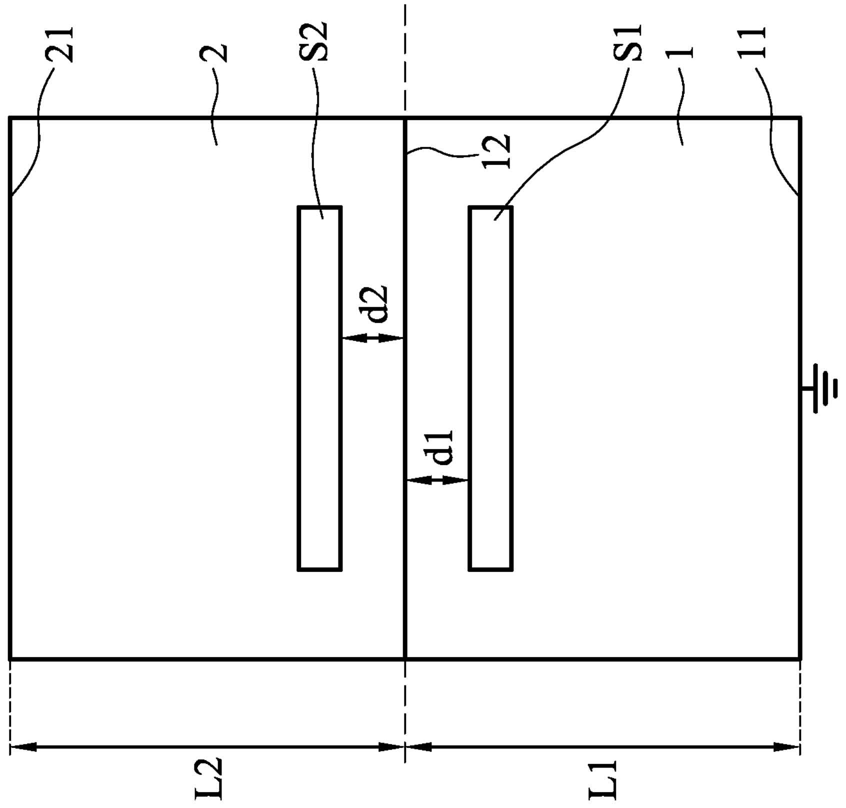
FIG. 1C shows the unbent antenna of the first embodiment of the invention.

FIG. 1C shows the unbent antenna of the first embodiment of the invention. With reference to FIG. 1C, in one embodiment, the first section length L1 is measured from the first grounding edge 11 to the first bending edge 12. The first minimum distance d1 is measured from the first slot S1 to the first bending edge 12. The first minimum distance d1 is greater than zero. A ratio of the first section length L1 to the first minimum distance d1 is between 6 and 11. In the embodiments of the invention, the first minimum distance d1 is measured from the nearest point of the first slot S1 relative to the first bending edge 12.

With reference to FIG. 1C, in one embodiment, the second section 2 has a free edge 21. A second section length L2 is measured from the free edge 21 to the first bending edge 12. A second minimum distance d2 is measured from the second slot S2 to the first bending edge 12. The second minimum distance d2 is greater than zero. The ratio of the second section length L2 to the second minimum distance d2 is between 6 and 11. In the embodiments of the invention, the second minimum distance d2 is measured from the nearest point of the second slot S2 relative to the first bending edge 12.

With reference to FIG. 1C, in this embodiment, the first slot S1 is a longitudinal slot, and the first slot S1 extends in a direction parallel to the first bending edge 12. Similarly, the second slot S2 is a longitudinal slot, and the second slot S2 extends in a direction parallel to the first bending edge 12.

Figure 2:
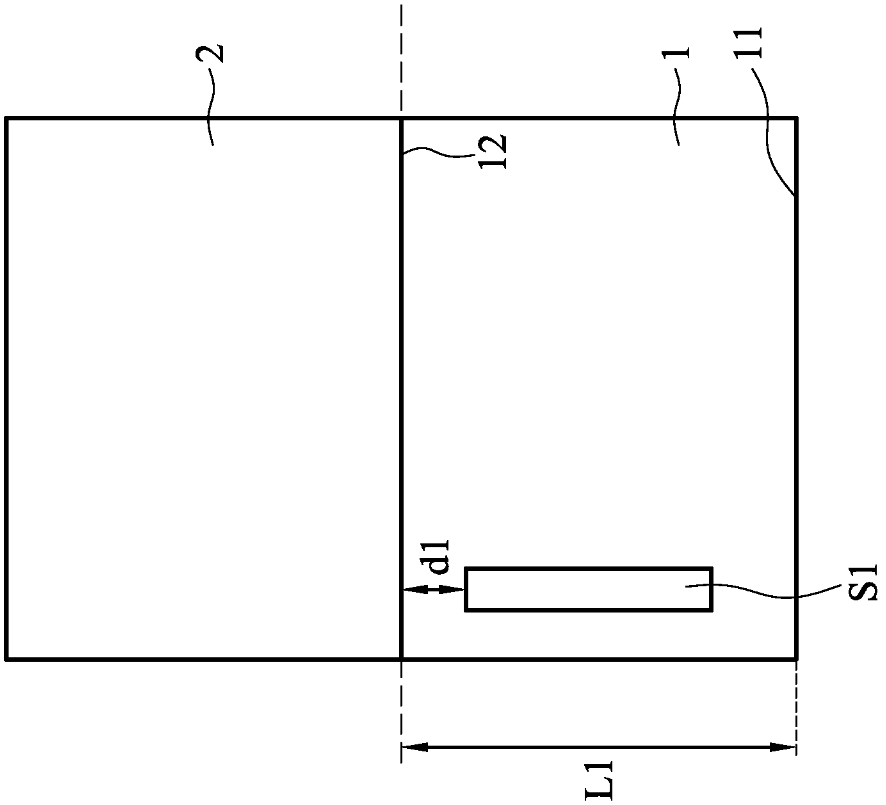
FIG. 2 shows an unbent antenna of a second embodiment of the invention.

FIG. 2 shows an unbent antenna of a second embodiment of the invention. With referent to FIG. 2, in this embodiment, the first slot S1 is a longitudinal slot, and the first slot S1 extends in a direction perpendicular to the first bending edge 12.

Figure 3:
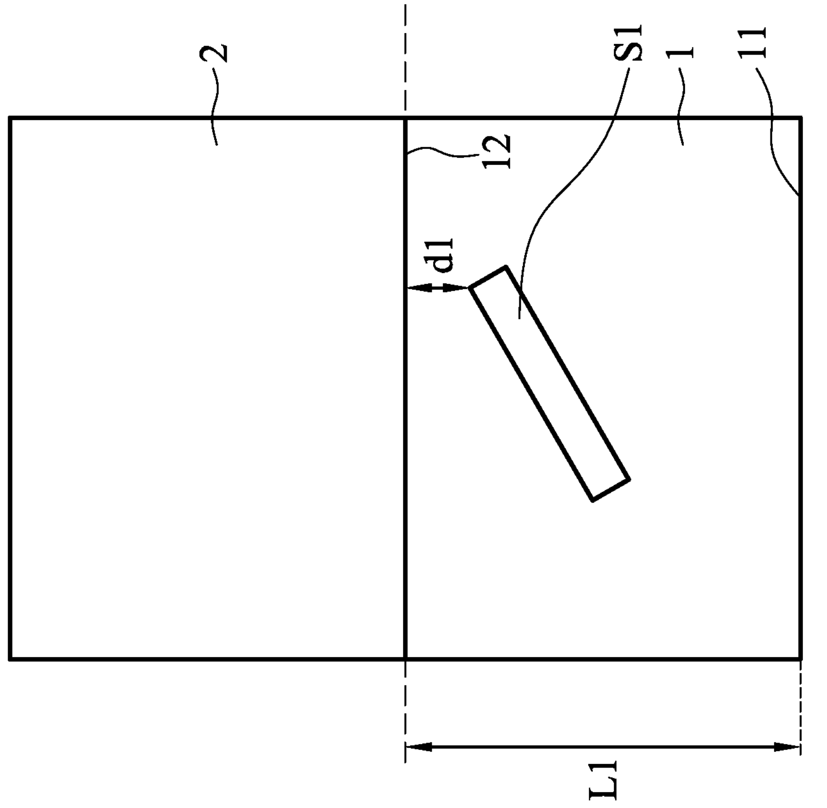
FIG. 3 shows an unbent antenna of a third embodiment of the invention.

FIG. 3 shows an unbent antenna of a third embodiment of the invention. With referent to FIG. 3, in this embodiment, the first slot S1 is a longitudinal slot, and the first slot S1 extends in a tilted direction relative to the first bending edge 12.

With reference to FIGS. 1C, 2 and 3, in one embodiment, the first slot S1 is an enclosed slot.

Figure 4:
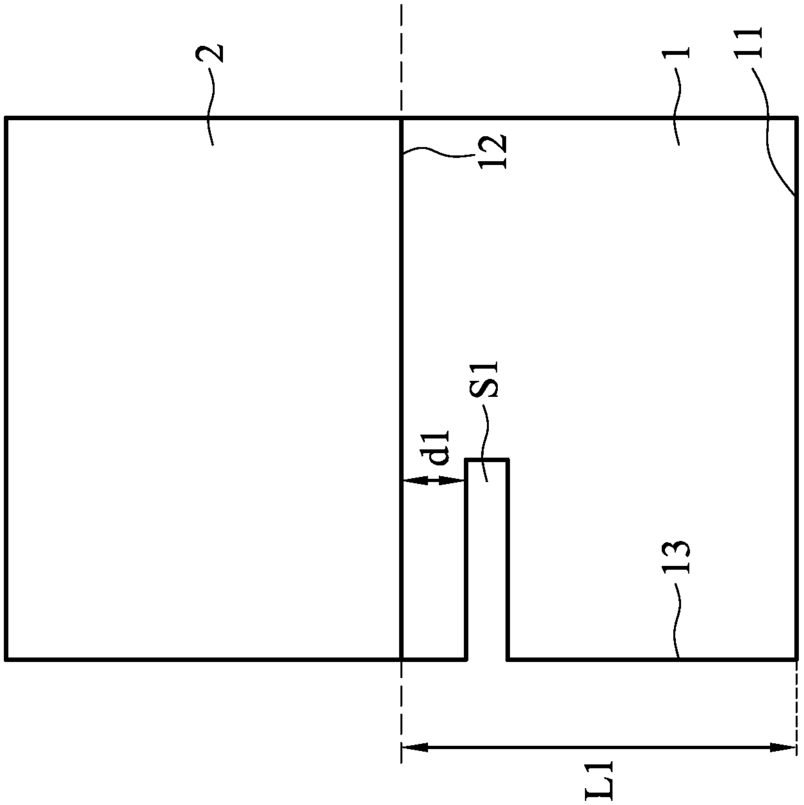
FIG. 4 shows an unbent antenna of a fourth embodiment of the invention.

FIG. 4 shows an unbent antenna of a fourth embodiment of the invention. With referent to FIG. 4, in this embodiment, the first slot S1 is a notch, and the first slot S1 extends to a lateral edge 13 of the first section 1.

Figure 5:
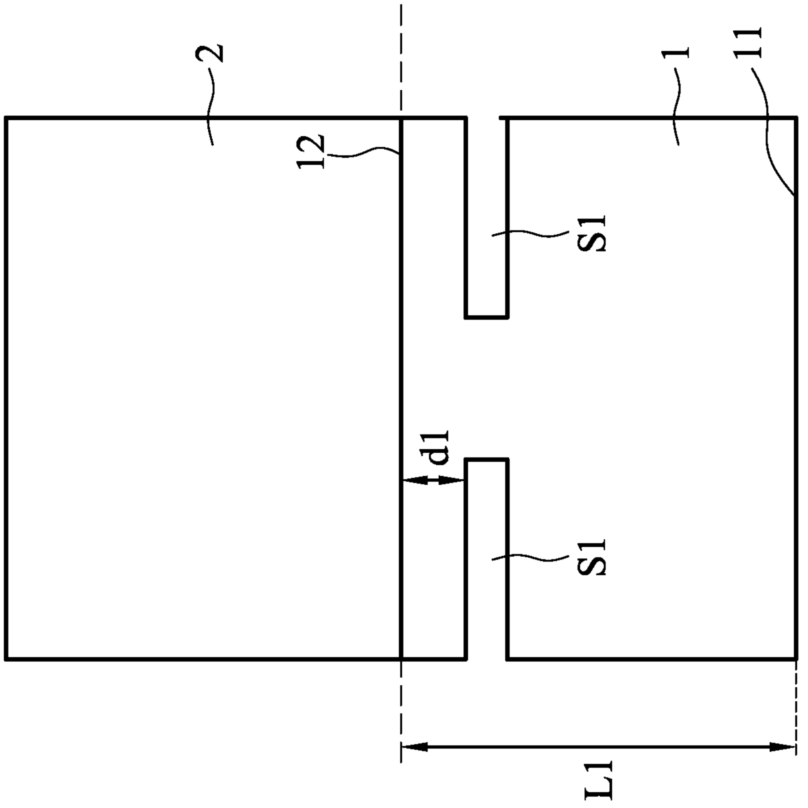
FIG. 5 shows an unbent antenna of a fifth embodiment of the invention.

FIG. 5 shows an unbent antenna of a fifth embodiment of the invention. With referent to FIG. 5, in this embodiment, two first slots S1 are configured on the same straight line.

Figure 6:
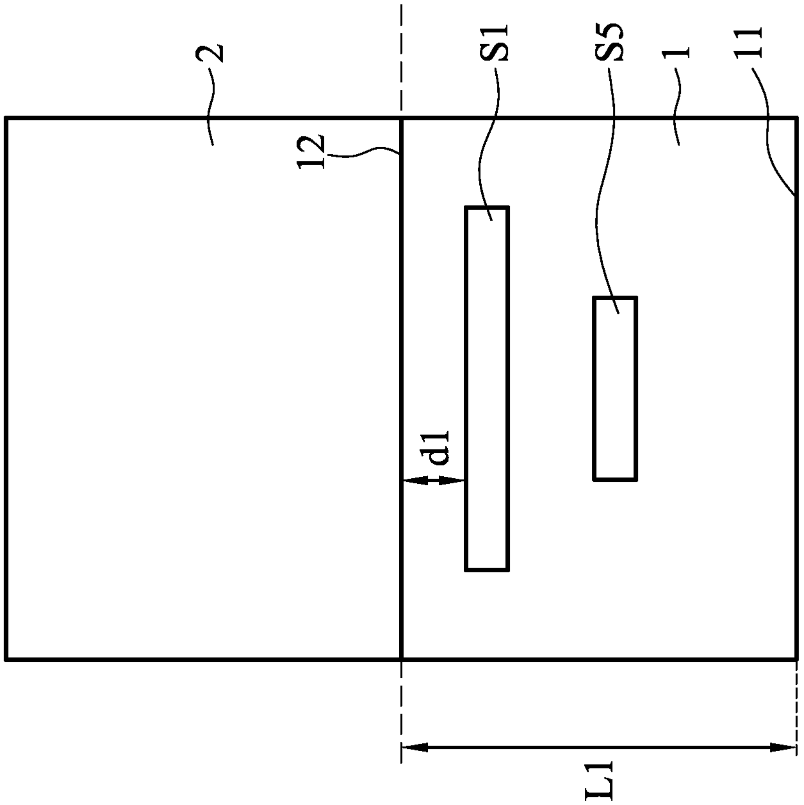
FIG. 6 shows an unbent antenna of a sixth embodiment of the invention.

FIG. 6 shows an unbent antenna of a sixth embodiment of the invention. With referent to FIG. 6, in this embodiment, a first auxiliary slot S5 is formed on the first section 1, and the first auxiliary slot S5 is measured from the first slot S1 to the first grounding edge 11.

Figure 7:
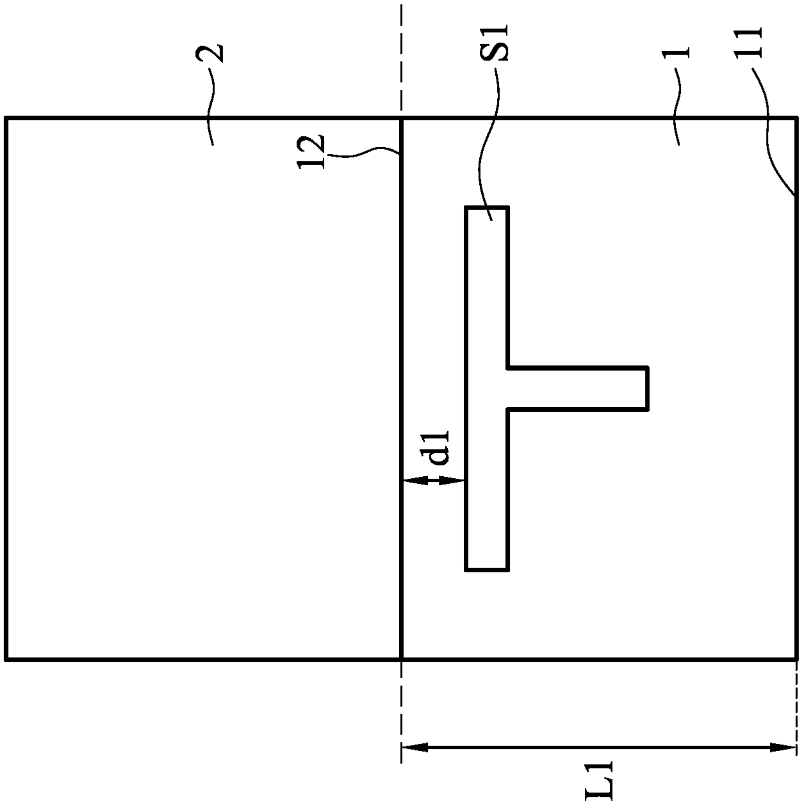
FIG. 7 shows an unbent antenna of a seven embodiment of the invention.

FIG. 7 shows an unbent antenna of a seven embodiment of the invention. With referent to FIG. 7, in this embodiment, the first slot S1 is a T-shaped opening.

Figure 8A:
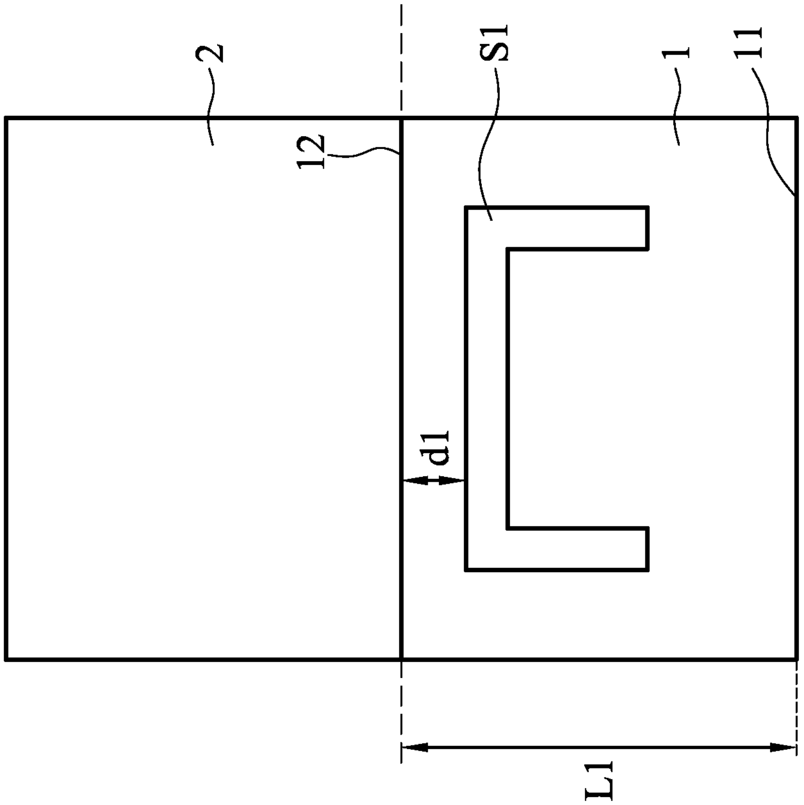
FIGS. 8A and 8B show unbent antennas of an eighth embodiment of the invention.
Figure 8B:
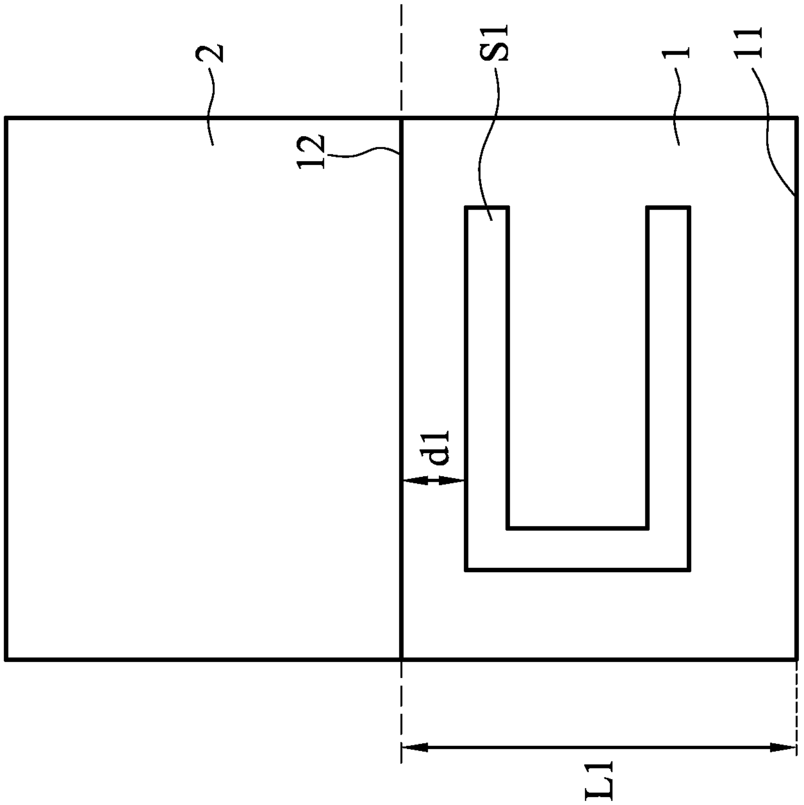

FIGS. 8A and 8B show unbent antennas of an eighth embodiment of the invention. With referent to FIGS. 8A and 8B, in this embodiment, the first slots S1 are U-shaped openings.

Figure 9:
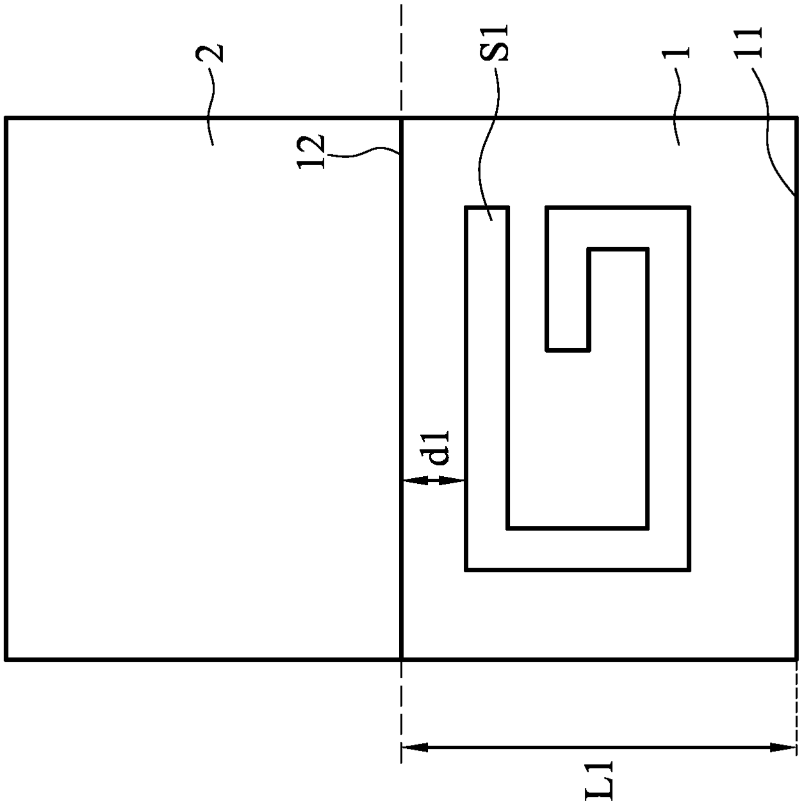
FIG. 9 shows an unbent antenna of a ninth embodiment of the invention.

FIG. 9 shows an unbent antenna of a ninth embodiment of the invention. With referent to FIG. 9, in this embodiment, the first slot S1 is a G-shaped opening.

Figure 10:
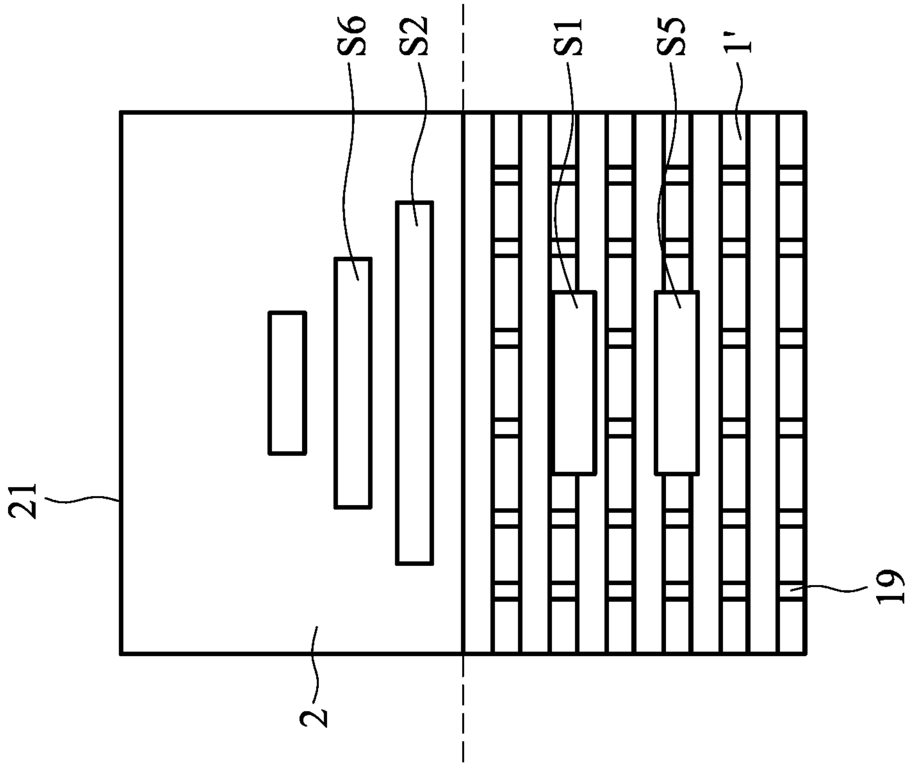
FIG. 10 shows an unbent antenna of a tenth embodiment of the invention.

In the embodiments above, the antenna is an integrally formed metal sheet. However, the disclosure is not meant to restrict the invention. FIG. 10 shows an unbent antenna of a tenth embodiment of the invention. With referent to FIG. 10, in this embodiment, the first section 1' is a multi-layer stacked IC package, and the second section 2 is a metal sheet. The first section 1' has a plurality of via holes 19 passing through it.

With referent to FIG. 10, in this embodiment, a second auxiliary slot S6 is formed on the second section 2, and the second auxiliary slot S6 is measured from the second slot S2 to the free edge 21.

Figure 11:
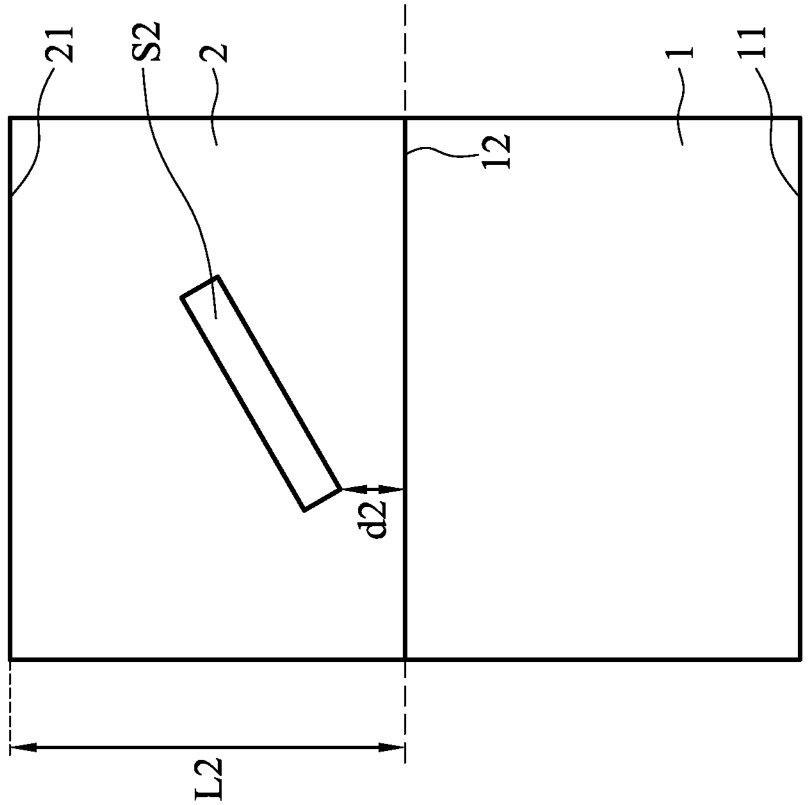
FIG. 11 shows an unbent antenna of an eleventh embodiment of the invention.

With reference to FIGS. 2, 3 and 4, in one embodiment, the antenna has no second slot. That means, there is no slot on the second section 2. FIG. 11 shows an unbent antenna of an eleventh embodiment of the invention. With referent to FIG. 11, in this embodiment, the antenna has no first slot. That means, there is no slot on the first section 1. The first slot 1 of the embodiment of the invention can be independently utilized without the second slot 2. Similarly, the second slot 2 of the embodiment of the invention can be independently utilized without the first slot 1.

The shape, the location and the orientation of the second slot 2 can be modified in the ways similar to the first slot 1 as presented in the embodiments mentioned above.

Compared to the conventional antenna with dipole sections and path sections, the antenna of the embodiment of the invention can transmit a higher-band signal relative to the low-band signal and the high-band signal transmitted by the conventional antenna. That means, the antenna of the embodiment of the invention can transmit wireless signals of three different bands. In the embodiment of the invention, the first slot increases the path of the surface current on the first section and generates additional radiation mode with high-gain performance. The second slot increases the path of the surface current on the second section, which enhances the directivity of the high-band signal and leads to high-gain performance.

In the embodiment and the claims, the first, second, etc. terms are only used for numbering, and do not mean that there is a necessary order therebetween.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna, comprising:

a first radiator, comprising a first section and a second section, wherein the first section comprises a first grounding edge and a first bending edge, the second section is connected to the first bending edge, the first grounding edge is grounded, the first section is not parallel to the second section, and a first slot is formed on the first section; and a second radiator, comprising a third section and a fourth section, wherein the third section comprises a second grounding edge and a second bending edge, the fourth section is connected to the second bending edge, the second grounding edge is grounded, the third section is not parallel to the fourth section, and the first section is parallel to the third section.

2. The antenna as claimed in claim 1, wherein a first section length is measured from the first grounding edge to the first bending edge, a first minimum distance is measured from the first slot to the first bending edge, the first minimum distance is greater than zero, and a ratio of the first section length to the first minimum distance is between 6 and 11.

3. The antenna as claimed in claim 2, wherein the first slot is a longitudinal slot, and the first slot extends in a direction parallel to the first bending edge.

4. The antenna as claimed in claim 2, wherein the first slot is a longitudinal slot, and the first slot extends in a direction perpendicular to the first bending edge.

5. The antenna as claimed in claim 2, wherein the first slot is a notch, and the first slot extends to a lateral edge of the first section.

6. The antenna as claimed in claim 2, wherein the first slot is an enclosed slot.

7. The antenna as claimed in claim 2, wherein a first auxiliary slot is formed on the first section, and the first auxiliary slot is measured from the first slot to the first grounding edge.

8. The antenna as claimed in claim 2, wherein a second slot is formed on the second section, the second section has a free edge, a second section length is measured from the free edge to the first bending edge, a second minimum distance is measured from the second slot to the first bending edge, the second minimum distance is greater than zero, and a ratio of the second section length to the second minimum distance is between 6 and 11.

9. The antenna as claimed in claim 8, wherein a second auxiliary slot is formed on the second section, and the second auxiliary slot is measured from the second slot to the free edge.

10. The antenna as claimed in claim 2, further comprising a feed conductor, wherein the feed conductor is disposed between the first section and the third section, and the feed conductor is coupled to the first radiator and the second radiator.

11. The antenna as claimed in claim 10, wherein a third slot is formed on the third section, the first slot is symmetric to the third slot relative to a symmetric plane, the symmetric plane is parallel to the first section and the third section, and the symmetric plane is located between the first section and the third section.

12. The antenna as claimed in claim 11, wherein the second section is perpendicular to the first section, the fourth section is perpendicular to the third section, and the first radiator is symmetric to the second radiator relative to the symmetric plane.

13. The antenna as claimed in claim 2, wherein the first section is a multi-layer stacked IC package, and the second section is a metal sheet.

14. The antenna as claimed in claim 2, wherein the first radiator is an integrally formed metal sheet.

15. An antenna, comprising:

a first radiator, comprising a first section and a second section, wherein the first section comprises a first grounding edge and a first bending edge, the second section is connected to the first bending edge, the first grounding edge is grounded, the first section is not parallel to the second section, and a slot is formed on the second section; and a second radiator, comprising a third section and a fourth section, wherein the third section comprises a second grounding edge and a second bending edge, the fourth section is connected to the second bending edge, the second grounding edge is grounded, the third section is not parallel to the fourth section, and the first section is parallel to the third section.

16. The antenna as claimed in claim 15, wherein the second section has a free edge, a section length is measured from the free edge to the first bending edge, a minimum distance is measured from the slot to the first bending edge, the minimum distance is greater than zero, and a ratio of the section length to the minimum distance is between 6 and 11.

17. An antenna, comprising:

a first radiator, comprising a first section and a second section, wherein the first section comprises a first grounding edge and a first bending edge, the second section is connected to the first bending edge, the first grounding edge is grounded, the second section is perpendicular to the first section, the second section extends in a first direction, and a first slot is formed on the first radiator; and a second radiator, comprising a third section and a fourth section, wherein the third section comprises a second grounding edge and a second bending edge, the fourth section is connected to the second bending edge, the second grounding edge is grounded, the fourth section is perpendicular to the third section, the first section is parallel to the third section, the fourth section extends in a second direction, and the second direction is opposite to the first direction.

18. The antenna as claimed in claim 17, wherein a third slot is formed on the second radiator, the first slot is symmetric to the third slot relative to a symmetric plane, the symmetric plane is parallel to the first section and the third section, and the symmetric plane is located between the first section and the third section.

19. The antenna as claimed in claim 18, wherein a first section length is measured from the first grounding edge to the first bending edge, a first minimum distance is measured from the first slot to the first bending edge, the first minimum distance is greater than zero, a ratio of the first section length to the first minimum distance is between 6 and 11.

20. The antenna as claimed in claim 19, further comprising a grounding member, the first grounding edge is connected to the grounding member, the second grounding edge is connected to the grounding member, the first section is perpendicular to the grounding member, and the third section is perpendicular to the grounding member.

* * * * *